United States Patent
Kang et al.

(10) Patent No.: US 11,010,128 B1
(45) Date of Patent: May 18, 2021

(54) METHOD FOR ADJUSTING TOUCH SENSITIVITY AND MOBILE DEVICE UTILIZING THE SAME

(71) Applicant: WISTRON CORP., New Taipei (TW)

(72) Inventors: Jhih-Hao Kang, New Taipei (TW); Sheng-Hung Hsieh, New Taipei (TW); Tai Yi Wu, New Taipei (TW); Yuwei Yu, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/857,278

(22) Filed: Apr. 24, 2020

(30) Foreign Application Priority Data

Dec. 31, 2019 (TW) .................................. 108148565

(51) Int. Cl.
*G06F 3/16* (2006.01)
*G06F 3/041* (2006.01)

(52) U.S. Cl.
CPC ............ *G06F 3/167* (2013.01); *G06F 3/0416* (2013.01)

(58) Field of Classification Search
CPC .. G06F 3/16; G06F 3/167; G06F 3/043–0436; G06F 3/0416
See application file for complete search history.

(56) References Cited

U.S. PATENT DOCUMENTS

| 2013/0181951 | A1* | 7/2013 | Klinghult | G06F 3/0416 345/177 |
|---|---|---|---|---|
| 2018/0275951 | A1* | 9/2018 | Kagoshima | G10L 15/20 |
| 2018/0348853 | A1* | 12/2018 | Shchur | G06F 21/32 |
| 2019/0317593 | A1* | 10/2019 | Binder | G06F 3/017 |

FOREIGN PATENT DOCUMENTS

| CN | 103927096 A | 7/2014 |
|---|---|---|
| CN | 109753191 A | 5/2019 |

* cited by examiner

*Primary Examiner* — Mong-Shune Chung
(74) *Attorney, Agent, or Firm* — Locke Lord LLP; Tim Tingkang Xia, Esq.

(57) ABSTRACT

A method for adjusting touch sensitivity is disclosed. The method comprises steps of enabling an audio-collecting device to receive one or more original audio data; determining whether an audio parameter of at least one of the one or more original audio data matches at least one pre-stored audio parameter; and adjusting a touch sensitivity of a touch input interface to one of a plurality of pre-stored touch sensitivity in response to the audio parameter of the at least one original audio data matching the at least one pre-stored audio parameter, wherein the pre-stored touch sensitivity corresponds to the at least one pre-stored audio parameter.

18 Claims, 7 Drawing Sheets

METHOD FOR ADJUSTING TOUCH SENSITIVITY AND MOBILE DEVICE UTILIZING THE SAME

CROSS-REFERENCE TO RELATED APPLICATIONS

This non-provisional application claims priority under 35 U.S.C. § 119(a) on Patent Application No(s). 108148565 filed in Taiwan, R.O.C. on Dec. 31, 2019, the entire contents of which are hereby incorporated by reference.

BACKGROUND

1. Technical Field

This present disclosure relates to a method for adjusting touch sensitivity and a mobile device utilizing the same, more particularly to a method for adjusting touch sensitivity and a mobile device utilizing the same which involve in the adjustment between modes of touch sensitivity by analyzing audio signals.

2. Related Art

A touch screen is one of essential input elements of a mobile device such as a handheld smartphone. Most users operate touch screens with finger touches. However, it may be necessary for users to wear gloves in some particular places such as factories or warehouses. In the case in which touch sensitivities are set by parameters of finger touches on touch screens, it would be difficult for users wearing gloves to control their mobile devices, or the users may even not be able to control their mobile devices.

Although some mobile devices provide two modes (e.g. a normal mode and a glove mode) for users to switch through edit menus, it may be inconvenient to switch between different modes of touch sensitivity through the edit menus in some certain conditions. For example, it is assumed that the touch sensitivity is a normal mode while a user wearing gloves intends to control the mobile device to switch to a glove mode from the normal mode. In this situation, the user wearing the gloves has a difficulty to operate the touch screen due to the low-sensitivity of the touch screen. As a result, the user must take the gloves off and adjust the touch sensitivity without the gloves on. Then the user put the gloves back on the hands. This is quite inconvenient for user operations.

In addition, a lot of mobile devices currently support functions of voice commands, but it will take time to build up databases for the functions of voice commands. Besides, different languages would require different language databases, and it inevitably consumes much developing time for building various language databases. Furthermore, uses may wear masks to keep out the cold in some certain environments (e.g. a low-temperature environment). Voices of the users wearing masks significantly changes, which results in the increasing difficulty of building language databases.

SUMMARY

According to one or more embodiment of the present disclosure, a method for adjusting touch sensitivity is disclosed. The method comprises steps of: enabling an audio-collecting device to receive one or more original audio data; determining whether an audio parameter of at least one of the one or more original audio data matches at least one pre-stored audio parameter; and adjusting a touch sensitivity of a touch input interface to one of a plurality of pre-stored touch sensitivity in response to the audio parameter of the at least one original audio data matching the at least one pre-stored audio parameter, wherein the pre-stored touch sensitivity corresponds to the at least one pre-stored audio parameter.

According to one or more embodiment of the present disclosure, a mobile device is disclosed. The mobile device includes an audio-collecting device, a touch input interface, a memory and a processor, wherein the processor is electrically connected to the audio-collecting device, the touch input interface and the memory. The audio-collecting device is configured to receive one or more original audio data. A touch sensitivity of the touch input interface is adjustable. The memory has a database which is configured to store at least one pre-stored audio parameter. The processor is programmed for: enabling the audio-collecting device to receive the one or more original audio data; determining whether an audio parameter of at least one of the one or more original audio data matches the at least one pre-stored audio parameter; and adjusting the touch sensitivity of the touch input interface to one of a plurality of pre-stored touch sensitivity in response to the audio parameter of the at least one original audio data matching the at least one pre-stored audio parameter, wherein the pre-stored touch sensitivity corresponds to the at least one pre-stored audio parameter.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
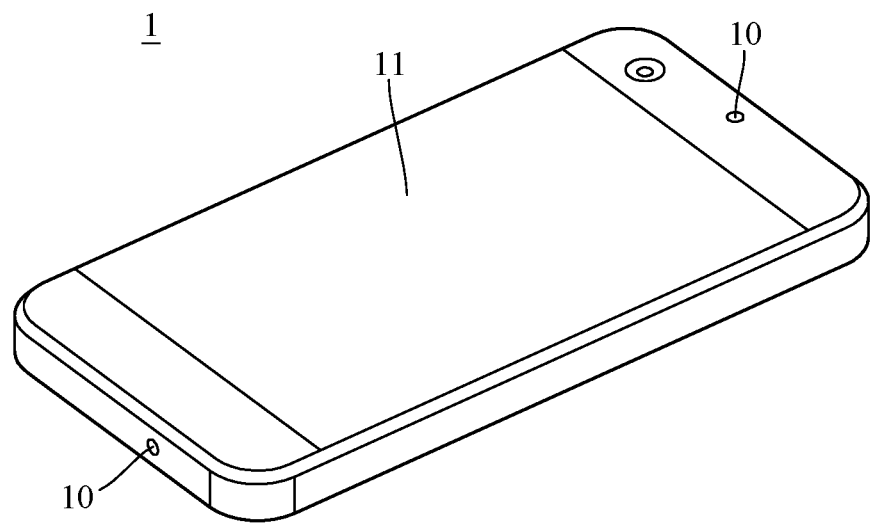
FIG. 1 is a schematic diagram of a mobile device according to one embodiment of the present disclosure.
Figure 2:
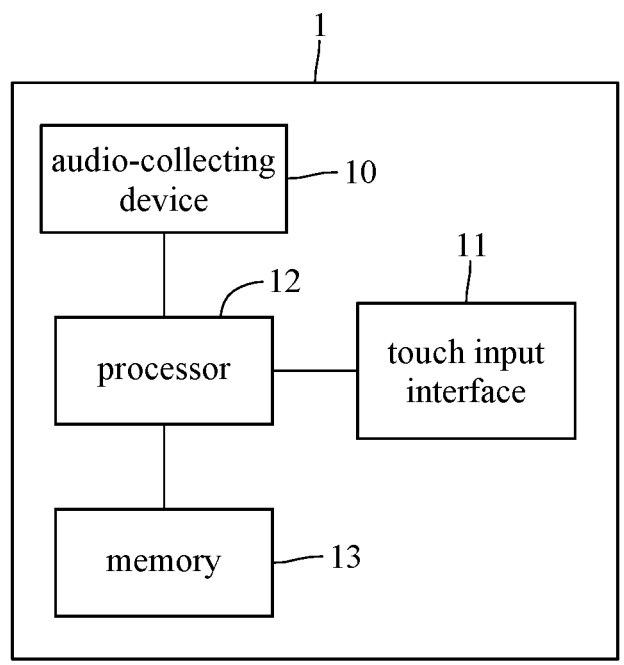
FIG. 2 is a block diagram of a mobile device according to one embodiment of the present disclosure.

Please refer to FIG. 1 and FIG. 2. FIG. 1 is a schematic diagram of a mobile device according to one embodiment of the present disclosure. FIG. 2 is a block diagram of a mobile device according to one embodiment of the present disclosure. As shown in FIG. 1 and FIG. 2, a mobile device 1 includes an audio-collecting device 10, a touch input interface 11, a processor 12 and a memory 13. The processor 12 is electrically connected to the audio-collecting device 10, the touch input interface 11 and the memory 13, wherein the touch input interface 11 is, for example, a touch pad, a touch mouse, a touch screen or a touch panel. In this embodiment, the audio-collecting device 10 of the mobile device 1 includes an upper and a lower microphone. That is, the mobile device 1 supports the function of a dual microphone, with one of the two microphone is configured to collect noises from the environment for the purpose of noise cancellation. However, the present disclosure is not limited to the above embodiment. Actually, in another embodiment, the mobile device 1 supports the function of a single microphone. That is, the audio-collecting device 10 merely includes one of the above-mentioned upper and lower microphone. A touch sensitivity of the touch input interface 11 can be adjusted by the processor 12 and accordingly the touch sensitivity includes a variety of modes, such as a low-sensitivity mode or a high-sensitivity mode. The memory 13 has a database stored and a plurality of pre-stored audio parameters are stored in the database.

Figure 3A:
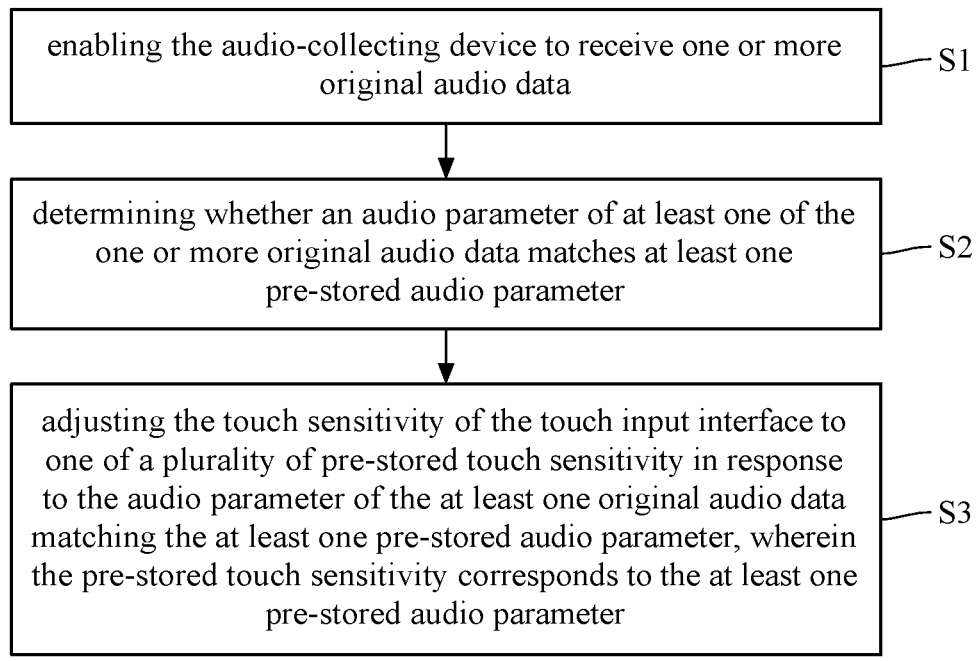
FIG. 3A is a flow chart of a method for adjusting touch sensitivity according to one embodiment of the present disclosure.

Please further refer to FIG. 3A, which is a flow chart of a method for adjusting touch sensitivity according to one embodiment of the present disclosure. The method can be implemented by the mobile device 1 shown in FIG. 1 and FIG. 2. As shown in FIG. 3A, in step S1, the processor 12 enables the audio-collecting device 10 to receive one or more original audio data. In step S2, the processor 12 determines whether an audio parameter of at least one of the one or more original audio data matches at least one pre-stored audio parameter. In step S3, in response to the audio parameter of the at least one original audio data matching the at least one pre-stored audio parameter, the processor 12 adjusts the touch sensitivity of the touch input interface 11 to one of a plurality of pre-stored touch sensitivity, wherein the pre-stored touch sensitivity corresponding to the at least one pre-stored audio parameter.

In one embodiment, the step of enabling the audio-collecting device to receive the one or more original audio data by the processor 12 includes: comparing a volume value of each of the one or more original audio data to a preset value for selecting the at least one original audio data, wherein the volume value of the at least one original audio data is greater than the preset value. The method for adjusting touch sensitivity disclosed in the present disclosure will be illustrated in detail in FIG. 3B.

Figure 3B:
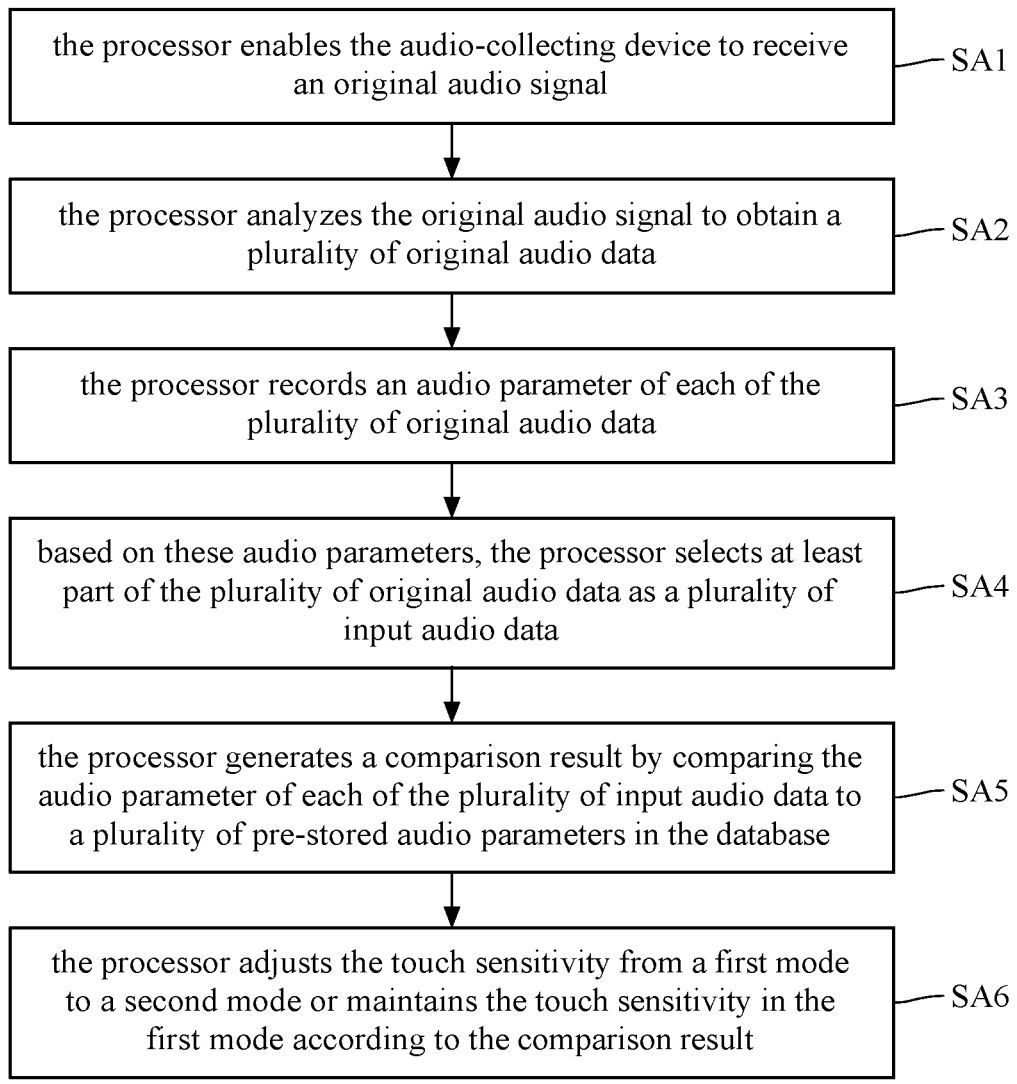
FIG. 3B is a flow chart of a method for adjusting touch sensitivity according to another embodiment of the present disclosure.

Please refer to FIG. 1, FIG. 2 and FIG. 3B. FIG. 3B is a flow chart of a method for adjusting touch sensitivity according to another embodiment of the present disclosure. Similarly, this method can be implemented by the mobile device 1 shown in FIG. 1 and FIG. 2. As shown in FIG. 3B, in step SA1, the processor 12 enables the audio-collecting device 10 to receive an original audio signal (also known as "raw data"). In practical, if initially the mobile device 1 is in a sleep state, then the user is allowed to wake up the touch input interface 11 by pressing a power button. Meanwhile, a background application program would be executed, and the audio-collecting device 10 is turned on as well. In another embodiment, the user is also allowed to turn on the audio-collecting device 10 by operations. In this case, the processor 12 generates an operation command and enables the audio-collecting device 10 according to the operation command. With the application program running in background, the enabled audio-collecting device 10 receives one or more sounds as a sampled original audio signal in a period of time (e.g. one minute), wherein these sounds are generated by tapping on the body of the mobile device 1. Further, the sampled original audio signal is stored in the memory 13.

In step SA2, the processor 12 analyzes the original audio signal to obtain a plurality of original audio data. Specifically, it is assumed that the user taps on the body of the mobile device 1 (e.g. taps on the body three times), the audio-collecting device 10 collects the sounds of tapping as the sampled original audio signal and then the sampled original audio signal would be stored in the memory 13. The processor 12 retrieves the original audio signal by reading the memory 13 and further decodes the original audio signal into three original audio data each corresponding to a respective one of the three sounds of tapping. In this embodiment, each of the three original audio data corresponds to a frame. In practical, all of the frames have the same size. Further, each original audio data is converted to be in form of frequency domain by the processor 12. In practical, the processor 12 converts each original audio data from the time domain to the frequency domain via the Fourier Transform. That is, the processor 12 is capable of obtaining amplitudes and phases of each original audio data with respect to various frequencies.

In step SA3, the processor 12 records an audio parameter of each of the plurality of original audio data. In this embodiment, the audio parameter includes a frequency value and/or a volume value corresponding to a maximum formant of the original audio data. In step SA4, based on these audio parameters, the processor 12 selects at least part of the plurality of original audio data as a plurality of input audio data. In one embodiment, as described above, each of these audio parameters includes a volume value. The processor compares the volume value of each of the plurality of original audio data to a preset value, so as to select the part of the plurality of original audio data, wherein the volume values of these selected original audio data is greater than the preset value.

Specifically, the processor 12 filters out some original audio data (e.g. noises) from the plurality of original audio data depending on the volume value of each of the plurality of original audio data, and takes these remaining original audio data as these input audio data. For example, it is assumed that the preset value is set as −50 dB. Accordingly, the processor 12 would filter out those original audio data which have volume values less than −50 dB, and takes these remaining original audio data which have volume values greater than −50 dB as these input audio data, with these input audio data are used for audio analysis of the method. Thereby, the increasing in computation of the processor and the misjudgment of adjustments of touch sensitivity, caused by one or more audio data associated with human factors or environmental noises, could be avoided.

Please refer back to FIG. 3. In step SA5, the processor 12 generates a comparison result by comparing the audio parameter of each of these input audio data (that is "these selected original audio data") to a plurality of pre-stored audio parameters in the database. In step SA6, the processor 12 adjusts the touch sensitivity from a first mode to a second mode, or maintains the touch sensitivity in the first mode according to the comparison result. The first mode is, for example, a low-sensitivity mode (that is, the corresponding pre-stored touch sensitivity is a low-sensitivity) while the second mode is, for example, a high-sensitivity mode (that is, the corresponding pre-stored touch sensitivity is a high-sensitivity). In other words, the processor 12 would compare the audio parameter of each of these selected original audio data to these pre-stored audio parameters in the database, and further determine a mode of the touch sensitivity of the touch input interface 11 based on the comparison result. In this embodiment, each of the modes corresponds to a pre-stored touch sensitivity. In practical, if the mode of the touch sensitivity determined by the processor 12 is identical to the current mode of the touch sensitivity, then the current mode of the touch sensitivity is maintained. In contrast, if the mode of the touch sensitivity determined by the processor 12 is not identical to the current mode of the touch sensitivity, then the current mode of the touch sensitivity is adjusted to the mode determined by the processor 12.

In this embodiment, the first mode and the second mode are associated with the above-mentioned pre-stored audio parameters. More Specifically, each of the pre-stored audio parameters corresponds to a respective one of touch sensitivity modes, and each of the touch sensitivity modes corresponds to a pre-stored touch sensitivity. When the processor 12 determines that the audio parameter of each of these selected original audio data matches one of the pre-stored audio parameters in the database, then the processor 12 determines the mode of the touch sensitivity of the touch input interface 11 is the mode corresponding to the pre-stored audio parameter, such as the first mode. For example, it is assumed that the processor 12 decides that an ideal touch sensitivity mode will be the first mode in the environment where the user stays according the above-described audio-parameter comparison. In this case, if the current mode of the touch sensitivity is the first mode, then the processor 12 maintains the current mode of the touch sensitivity, that is, the touch sensitivity remains unchanged. In contrast, if the current mode of the touch sensitivity (e.g. the second mode) is not the first mode, then the processor 12 will adjust the current mode of the touch sensitivity to the first mode. As a result, the user would be provided with an ideal touch sensitivity mode adapted to this environment.

Figure 4:
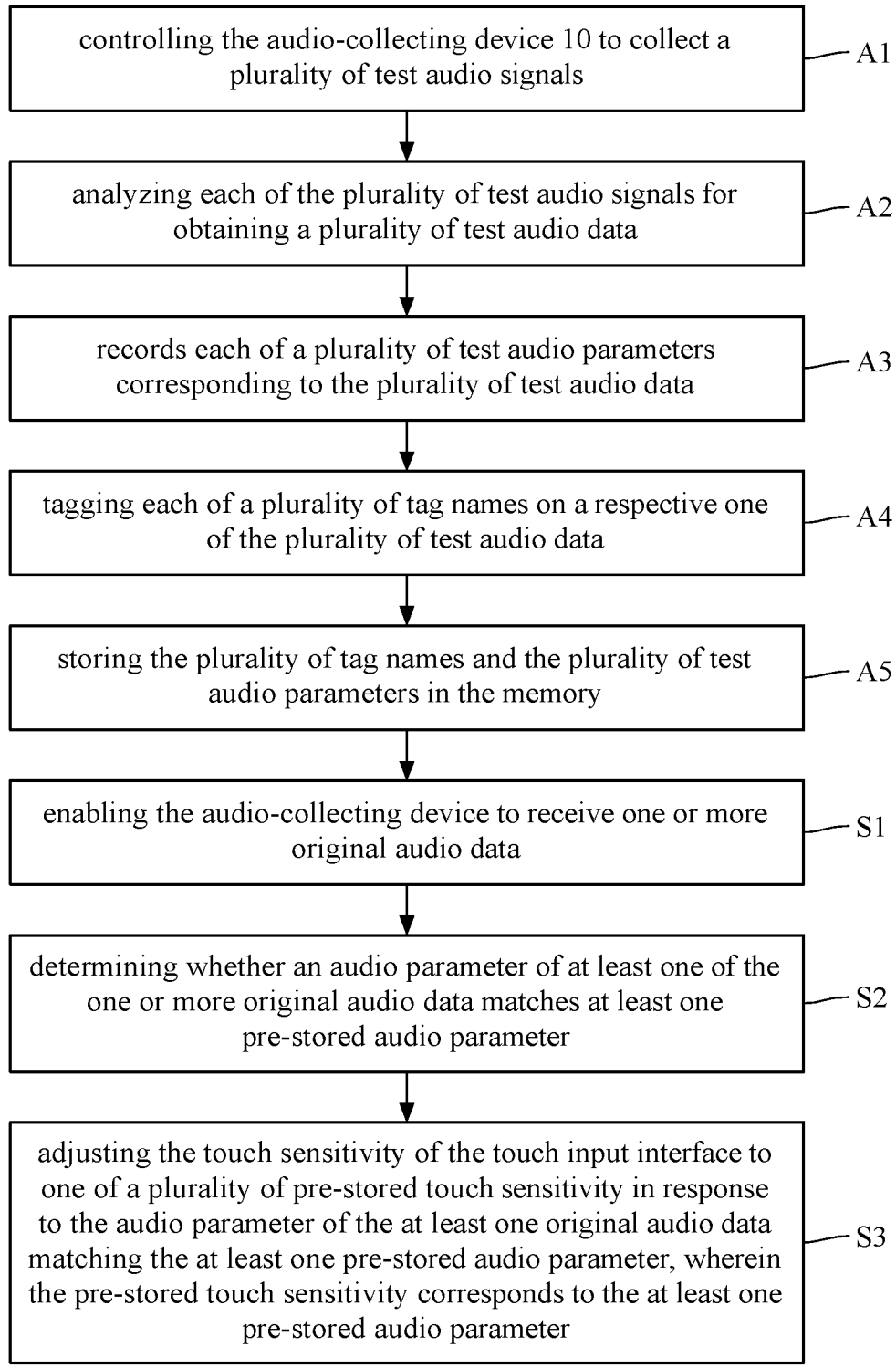
FIG. 4 is a flow chart of a method for adjusting touch sensitivity according to another embodiment of the present disclosure.

In practical, before implementing the embodiment of FIG. 3A, it is required to obtain a plurality of pre-stored audio parameters to be stored in the database, so as to perform the steps shown in FIG. 3A. In one embodiments, the database can be built through a big database from internet. In another embodiment, the database can be pre-built by manufacturer. In further another embodiment, the database can be built by a device owner. The process of building the database by the user will be illustrated in the following contents. Please refer to FIG. 4, which is a flow chart of a method for adjusting touch sensitivity according to another embodiment of the present disclosure. In comparison with FIG. 3, FIG. 4 further includes Figs. A1-A5 of building the database. As shown in FIG. 4, in step A1, the processor 12 controls the audio-collecting device 10 to collect a plurality of test audio signals. Specifically, in an example in which the mobile device 1 adjusts the touch sensitivity of the touch input interface 11 depending on whether the user wears gloves, the audio-collecting device 10 first collects sounds as the test audio signals for the purpose of building the database of sound features, wherein the sounds are generated by tapping on the body of the device with gloves on and without gloves. For example, with the gloves on, the user taps against the body of the mobile device 1 several times (e.g. 10 times), which generates a first test audio signal. Further, without wearing any gloves, the user taps against the body of the mobile device 1 with his/her fingertip several times (e.g. 10 times), which generates a second test audio signal. In another example, the user may even tap against the body of the mobile device 1 with another type of gloves on or with a finger-pulp several times (e.g. 10 times), which generates a third test audio signal. The following embodiment illustrates the case in which only two test audio signals are used. In practical, the user might tap against on a location of the body of the mobile device 1 near the audio-collecting device 10, so that the unintended activation of APPs or errors of gesture functions in the mobile device 1 can be avoided. However, the present disclosure is not limited to the above embodiment. In other embodiments, the user is allowed to tap on other locations of the body of the mobile device 1, or directly tap on the screen of the mobile device 1.

In step A2, the processor 12 analyzes each of these test audio signals for obtaining a plurality of test audio data. That is, the processor 12 decodes each of these test audio signals into a plurality of test audio data, wherein each of the plurality of test audio data corresponds to a frame. In practical, the plurality of frames has the same size. As described in the above embodiment, since the user taps against the body of the mobile device 1 with the gloves on 10 times, the processor 12 decodes the first test audio signal into 10 test audio data which corresponds to 10 frames. Similarly, since the user taps against the body of the mobile device 1 without the gloves 10 times, the processor 12 decodes the second test audio signal into another 10 test audio data which corresponds to another 10 frames. In practical, the number of these test audio data (frames) generated by decoding a test audio signal by the processor 12 is determined depending on the number of sound surges or the number of touches detected by the touch input interface.

Then, in step A3, the processor 12 records a plurality of test audio parameters corresponding to the plurality of test audio data, with each test audio parameter corresponding to a respective one of the plurality of test audio data. In step A4, the processor 12 tags each of a plurality of tag names on a respective one of the plurality of test audio data, which means that each of the plurality of test audio data is provided with a tag name. In this embodiment, the processor 12 would record the test audio parameter of each test audio data, wherein the test audio parameter can be, for example, a frequency value and/or a volume value corresponding to a maximum formant. In practical, step A3 and step A4 are interchangeable. That is, in other embodiments, the processor 12 might tag each of the plurality of tag names on the respective one of the plurality of test audio data, and then record the test audio parameter of each of the plurality of test audio data. In one embodiment, since the test audio parameter includes a frequency value and/or a volume value corresponding to a maximum formant, what the processor 12 actually records includes the frequency value and/or the volume value corresponding to the maximum formant of each test audio data. Further, in step A5, the processor 12 stores the plurality of tag names and the plurality of test audio parameters in the memory 13. In the embodiment of FIG. 4, the adjustment of touch sensitivity can be implemented by performing steps S1-S3 after steps A1-A5 of building the database are performed. Specifically, in step S1, the processor 12 enables the audio-collecting device 10 to receive one or more original audio data. In step S2, the processor 12 determines whether an audio parameter of at least one of the one or more original audio data matches at least one pre-stored audio parameter. In step S3, the processor 12 adjusts a touch sensitivity of the touch input interface 11 to one of a plurality of pre-stored touch sensitivity in response to the audio parameter of the at least one original audio data matching the at least one pre-stored audio parameter, wherein the pre-stored touch sensitivity corresponds to the at least one pre-stored audio parameter. Steps S1-S3 in the embodiment of FIG. 4 are similar to steps S1-S3 in the embodiment of FIG. 3A, and specific operations of FIG. 4 can be referred to FIG. 3. No more details are repeated herein.

Figure 5A:
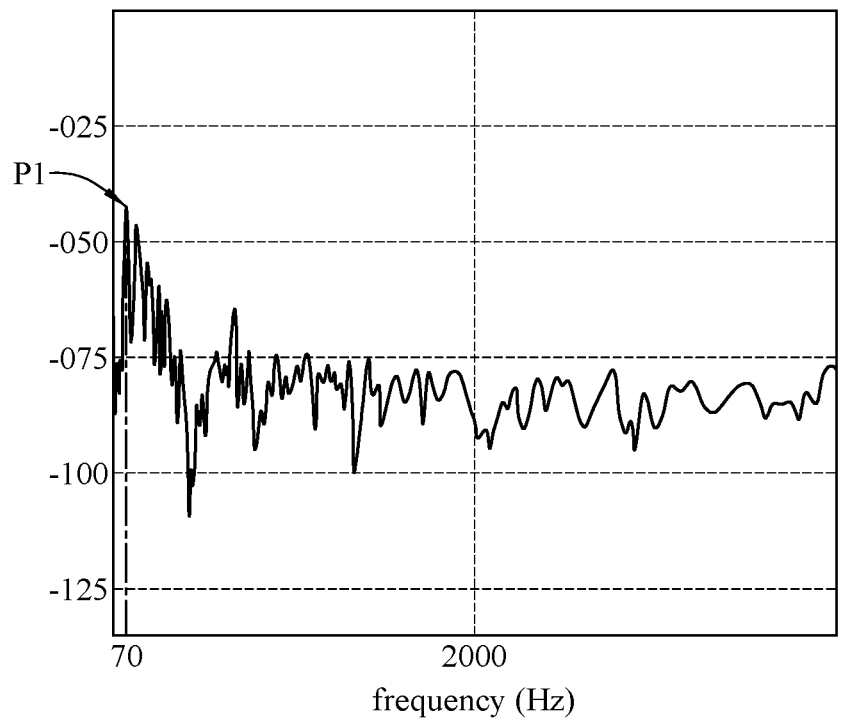
FIG. 5A is a diagram of a real-time audio spectrum obtained by tapping with gloves according to one embodiment of the present disclosure.
Figure 5B:
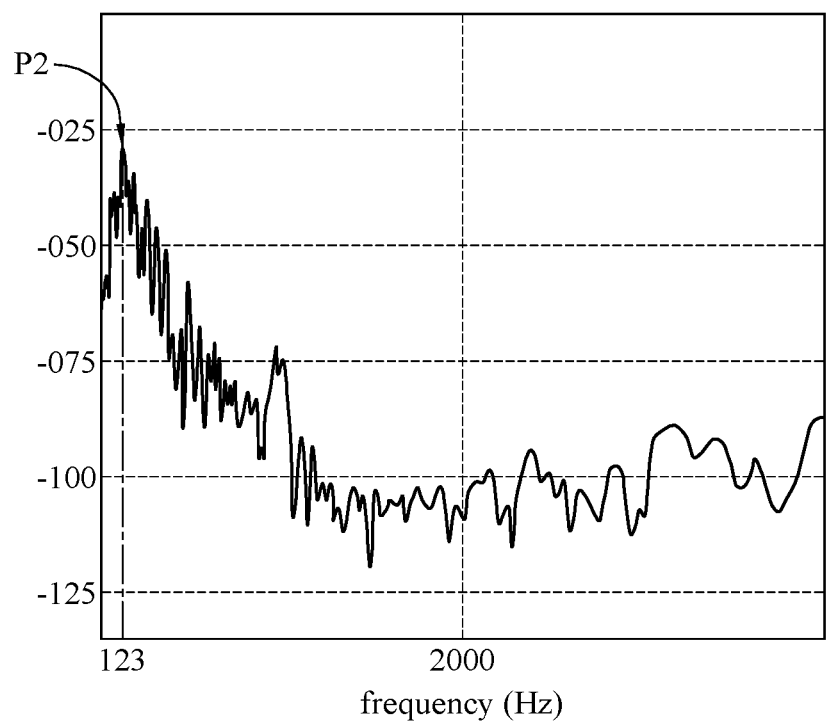
FIG. 5B is a diagram of a real-time audio spectrum obtained by tapping without gloves according to one embodiment of the present disclosure.

Please further refer to FIGS. 5A and 5B which illustrate how the test audio parameters are obtained. Specifically, FIG. 5A is a diagram of a real-time audio spectrum obtained by tapping with gloves on according to one embodiment of the present disclosure. FIG. 5B is a diagram of a real-time audio spectrum obtained by tapping without gloves according to one embodiment of the present disclosure. As shown in FIG. 5A and FIG. 5B, the input audio data has various peak values with respect to different frequencies, wherein most of the peak values represents noises from the environment or vibrations which are caused by tapping. In one embodiment of the present disclosure, the audio parameter of each original audio data or the test audio parameter of each test audio data includes a frequency value and/or a volume value corresponding to a maximum formant. In the embodiment of FIG. 5 in which the tapping is performed with gloves on, the frequency value corresponding to the maximum formant P1 is around 70 Hz while the volume value corresponding to the maximum formant P1 is around −42 dB. In the embodiment of FIG. 5B in which the tapping is performed without gloves, the frequency value corresponding to the maximum formant P2 is around 123 Hz while the volume value corresponding to the maximum formant P2 is around −29 dB. It is noted that the unit system of "Decibels Full Scale" is applied in the above two embodiments of FIG. 5A and FIG. 5B, wherein all measurement values are below a maximum reference value of 0 dB since "0 dBFS" considered as the maximum reference value. Accordingly, the volume values shown in FIG. 5A and FIG. 5B are all denoted as negative values.

In practical, in the sampling phase of test audio data, the frequency values corresponding to the maximum formants obtained from the multi-tapping by the user with gloves (e.g. industrial gloves) on may be slightly different. For example, the frequency values corresponding to the maximum formants might be 69 Hz, 70 Hz, 71 Hz, etc. Similarly, the volume values corresponding to the maximum formants obtained from the multi-tapping by the user with gloves (e.g. industrial gloves) on may be slightly different. For example, the volume values corresponding to the maximum formants might be −41 dB, −42 dB and −43 dB, etc. The case in which the user taps without wearing gloves is similar to the above case. For example, the frequency values corresponding to the maximum formant might be 122 Hz, 123 Hz and 124 Hz, etc. while the volume value corresponding to the maximum formants might be −28 dB, −29 dB and −30 dB, etc.

In addition to the recording of the test audio parameters, the processor 12 tags each of the plurality of tag names on a respective one of the plurality of test audio data, wherein each of those tag names can be, for example, a tag name of "Tapping with fingertips (without gloves)", a tag name of "Tapping with rubber gloves on" or a tag name of "Tapping with industrial gloves on". More specifically, in the sampling phase of test audio data, the processor 12 tags a tag name "Tapping with fingertips (without gloves)" on each test audio data which is collected in the condition that the user taps against the body of the mobile device 1 without wearing the gloves. After collecting those test audio data related to the tapping without gloves, the processor 12 then tags a tag name "Tapping with industrial gloves on" on each test audio data which is collected in the condition that the user taps against the body of the mobile device 1 with the gloves (e.g. industrial gloves) on. In practical, the user is allowed to perform audio data sampling for either the condition of tapping with gloves on or the condition of tapping without gloves first. The present disclosure is not limited to the above embodiment. In another embodiment, the mobile device 1 displays a user interface in the touch input interface 11, and accordingly the functions of tagging are set up via the user interface. For example, the user sets up the functions of tagging related to the tag names of "Tapping with fingertips (without gloves)", "Tapping with rubber gloves on" or "Tapping with industrial gloves on" to collect test audio data for each of the tag names, and then the audio parameters can be obtained by analyzing those collected test audio data for each of the tag names.

After collecting the above-described tag names and audio parameters, the processor 12 stores those tag names and audio parameters in the database of the memory 13 in step A5. Those tag names correspond to a plurality of pre-stored touch sensitivity respectively. More specifically, the processor 12 builds up the database of sound features by using those obtained tag names and test audio parameters. The Table I shown below is a table of sound features which is stored in the database according to one embodiment of the present disclosure, wherein the test audio parameters of these test audio data obtained in step A3 are the pre-stored audio parameters.

TABLE I

| Tag name | Pre-stored audio parameter (frequency) |
| --- | --- |
| Tapping with fingertips (without gloves) | 122 Hz~124 Hz |
| Tapping with rubber gloves on | 115 Hz~117 Hz |
| Tapping with industrial gloves on | 69 Hz~71 Hz |

The pre-stored audio parameters shown in the Table I of sound feature stored in the database include the frequency values corresponding to the maximum formants. However, in another embodiment, the pre-audio parameters as shown in Table II stored in the database include the frequency values as well as the volume values corresponding to the maximum formants.

TABLE II

| Tag name | Pre-stored audio parameter (frequency) | Pre-stored audio parameter (volume) |
| --- | --- | --- |
| Tapping with fingertips (without gloves) | 122 Hz~124 Hz | −28 dB~−30 dB |
| Tapping with rubber gloves on | 115 Hz~117 Hz | −35 dB~−37 dB |
| Tapping with industrial glove on | 69 Hz~71 Hz | −41 dB~−43 dB |

In one embodiment, each of the tag names corresponds to a mode of touch sensitivity. For example, the tag name of "Tapping with fingertips (without gloves)", the tag name of "Tapping with fingertips (without gloves)" and the tag name of "Tapping with industrial gloves on" shown in Table I and Table II correspond to a low-sensitivity mode (e.g. a first mode), a medium-sensitivity mode (e.g. a second mode) and a high-sensitivity mode (e.g. a third mode) respectively. In another embodiment, the tag name of "Tapping with fingertips (without gloves)" shown in Table I and Table II corresponds to the low-sensitivity mode (e.g. the first mode) while the tag names of "Tapping with rubber gloves on" and "Tapping with industrial gloves on" shown in Table I and Table II both correspond to the high-sensitivity mode (e.g. the second mode). In the above embodiment, both of Table I and Table II show the three tag names and their respective pre-stored audio parameters. However, in other embodiments, Table I and Table II may only include two tag names and their respective pre-stored audio parameters. For example, the two tag names are the tag names of "Tapping with fingertips (without gloves)" and "Tapping with industrial gloves on", wherein the tag name of "Tapping with fingertips (without gloves)" corresponds to a low-sensitivity mode (e.g. a first mode) while the tag name of "Tapping with industrial gloves on" corresponds to a high-sensitivity mode (e.g. a second mode). The contents of the above-mentioned tag names are merely used for illustrations. In other embodiments, each of the tag names may include code(s) corresponding to a certain touch sensitivity.

Figure 6:
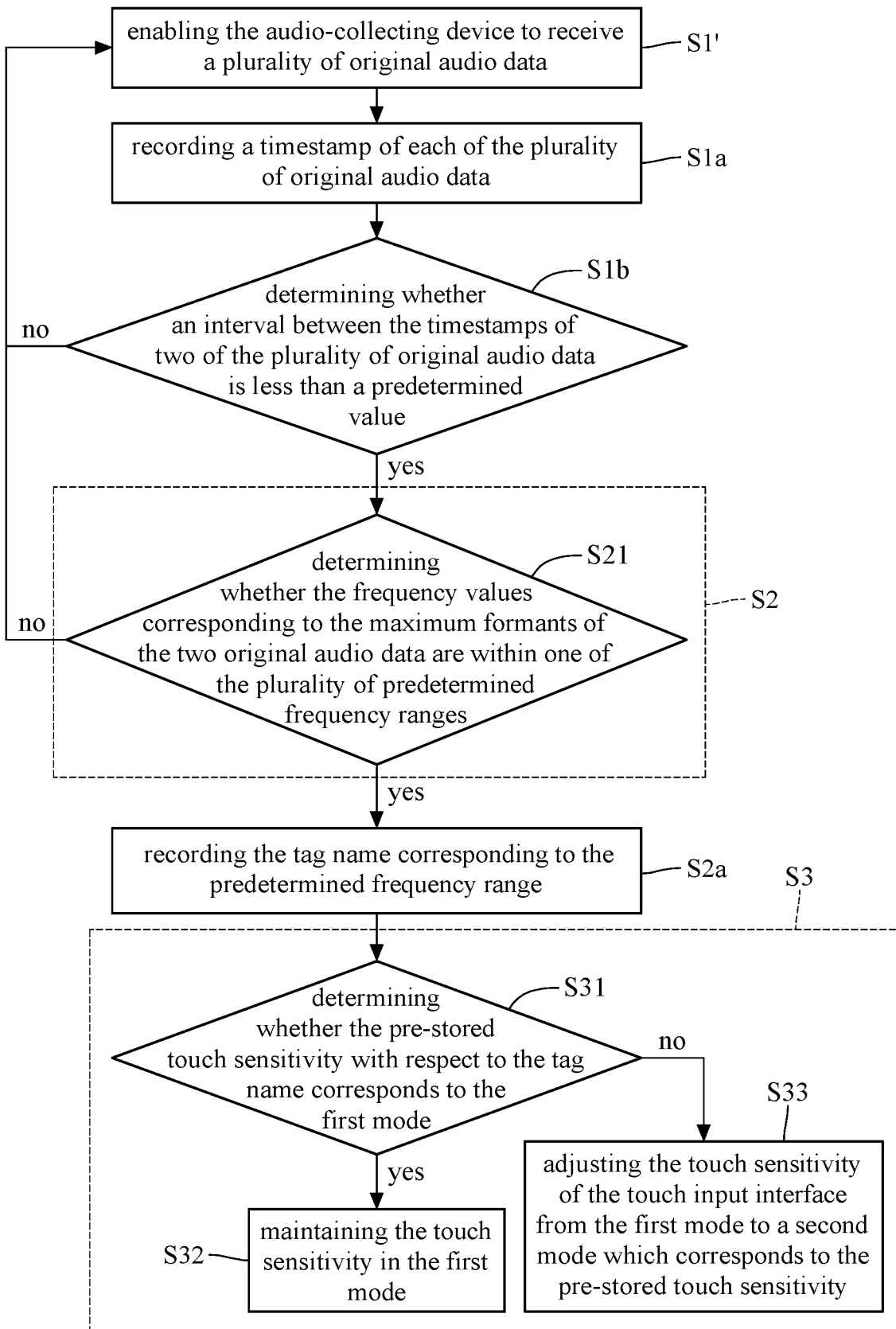
FIG. 6 is a flow chart of a method for adjusting touch sensitivity according to another embodiment of the present disclosure.

Please refer to FIG. 2 and FIG. 6. FIG. 6 is a flow chart of a method for adjusting touch sensitivity according to another embodiment of the present disclosure. In comparison with FIG. 3, FIG. 6 further includes steps S1a, S1b and S2a, wherein step S2 includes step S21, and step S3 includes steps S31-S33. Specifically, in one embodiment, the method for adjusting touch sensitivity further includes steps S1a showing that the processor 12 records a timestamp of each of the plurality of original audio data, wherein the timestamp indicates the time point at which the audio-collecting device 10 obtains the original audio data.

In step S1b, the processor 12 determines whether an interval between the timestamps of two of the plurality of original audio data is less than a predetermined value. Step S21 is performed when it is determined that the interval between the timestamps of two of the plurality of original audio data is less than the predetermined value (e.g. 2 seconds). The above-described Table I would be used for illustration in the following embodiment. That is, each of the pre-stored audio parameters shown in the table of sound features stored in the database is a predetermined frequency range, and each of the plurality of predetermined frequency ranges corresponds to a tag name. In step S21, the processor 12 determines whether the frequency values corresponding to the maximum formants of the two original audio data are within one of the plurality of predetermined frequency ranges. In response to the frequency values corresponding to the maximum formants of these original audio data being within one of the plurality of predetermined frequency ranges, the processor 12 records the tag name corresponding to the predetermined frequency range in step S2a.

Specifically, the processor 12 would determines whether the frequency values corresponding to the maximum formants of some of the plurality of original audio data are within a predetermined frequency range in the database. In one embodiment, if it is determined that the frequency values corresponding to the maximum formants of some of the plurality of original audio data are within a predetermined frequency range, then the processor 12 would record the timestamps of those original audio data as selected timestamps. In addition, the processor 12 records the tag name corresponding to the predetermined frequency range as a selected tag name. In a practical example, when frequency values corresponding to maximum formants of two of a plurality of original audio data are 122 Hz and 123 Hz respectively, the processor 12 determines the frequency values are within the predetermined frequency (122 Hz-124 Hz). Accordingly, the processor 12 records the timestamps of the two original audio data as well as the tag name of "Tapping with fingertips (without gloves)" corresponding to the predetermined frequency (122 Hz-124 Hz).

A comparison result is generated by the processor 12 after obtaining the timestamps and the tag names of those original audio data. Please refer to Table III, which a reference table of the comparison result according to one embodiment of the present disclosure. This reference table includes the above-mentioned tag names and timestamps.

TABLE III

| Selected tag name | Selected timestamp |
| --- | --- |
| Tapping with fingertips (without gloves) | 15:21:07 |
| Tapping with fingertips (without gloves) | 15:21:08 |

Refer back to FIG. 6, after obtaining the above-mentioned tag names in step S2a, depending on the recorded tag name, the processor 12 properly adjusts the touch sensitivity of the touch input interface 11 to the pre-stored touch sensitivity corresponding to the pre-stored audio parameter as shown in step S3. In one embodiment, step S3 includes steps S31-S33. In step S31, the processor 12 determines whether the pre-stored touch sensitivity with respect to the tag name corresponds to the first mode. When it is determined that the pre-stored touch sensitivity with respect to the tag name corresponds to the first mode, the processor 12 maintains the touch sensitivity in the first mode in step S32. On the contrary, when it is determined that the pre-stored touch sensitivity with respect to the tag name does not correspond to the first mode, the processor 12 adjusts the touch sensitivity of the touch input interface 11 from the first mode to a second mode which corresponds to the pre-stored touch sensitivity in step S33. In this embodiment, the first mode is the current mode of the touch sensitivity of the touch input interface 11. That is, the initial state of the touch sensitivity is the first mode (low touch sensitivity). In response to the pre-stored touch sensitivity with respect to the tag name not corresponding to the first mode, the processor 12 adjusts the mode of the touch sensitivity from the first mode (low touch sensitivity) to the second mode (high touch sensitivity).

In another embodiment, the initial state of the touch sensitivity is the second mode (high touch sensitivity). In response to the pre-stored touch sensitivity with respect to the tag name not corresponding to the second mode, the processor 12 adjusts the mode of the touch sensitivity from the second mode (high touch sensitivity) to the first mode (low touch sensitivity). It is assumed that the pre-stored touch sensitivity corresponding to the first mode is a low touch sensitivity while the pre-stored touch sensitivity corresponding to the second mode is a high touch sensitivity in the above embodiment. However, in a converse way, the pre-stored touch sensitivity corresponding to the first mode may be a high touch sensitivity while the pre-stored touch sensitivity corresponding to the second mode is a low touch sensitivity in another embodiment. The present disclosure is not limited to the above-mentioned embodiment. In practical, the present disclosure is not limited to the two modes as mentioned in the above embodiment. In another embodiment, in addition to the first mode and the second mode, the touch sensitivity of the touch input interface 11 further includes a third mode (e.g. the corresponding pre-stored touch sensitivity is a "medium touch sensitivity"). The touch sensitivity of the touch input interface 11 may further include more modes (e.g. a fourth mode, a fifth mode, etc.).

As Table III shows, the processor 12 determines the interval between the two timestamps is less than the predetermined value (e.g. 2 seconds) because the interval between the two timestamps is 1 second. Therefore, the processor 12 is capable of recognizing that the two input audio data are generated by continuously tapping twice, indicating an intention of the user to adjust the touch sensitivity. In the above embodiment, the function of adjusting the touch sensitivity is enabled by continuously tapping twice. In another embodiment, depending on actual demands, the function of adjusting the touch sensitivity could be enabled by continuously tapping three times or continuously tapping once. The present disclosure is not limited to the number of tapping in the above embodiments. In the previous embodiment of Table III, since the content of the tag name indicates "Tapping with fingertips (without gloves)", it means that the user intends to operates the touch input interface 11 in the first mode (low touch sensitivity). If the current touch sensitivity is the first mode, then the processor 12 controls the touch input interface 11 to remain the first mode without adjustments because the processor 12 determines that the selected tag name corresponds to the first mode. On the contrary, if the current touch sensitivity is the first mode and the content of the tag name shows "Tapping with industrial gloves on" which indicates that the user intends to operates the touch input interface 11 in the second mode (high touch sensitivity), then the processor 12 determines the tag name does not correspond to the first mode. Accordingly, the current touch sensitivity is adjusted from the first mode to the second mode.

Figure 7:
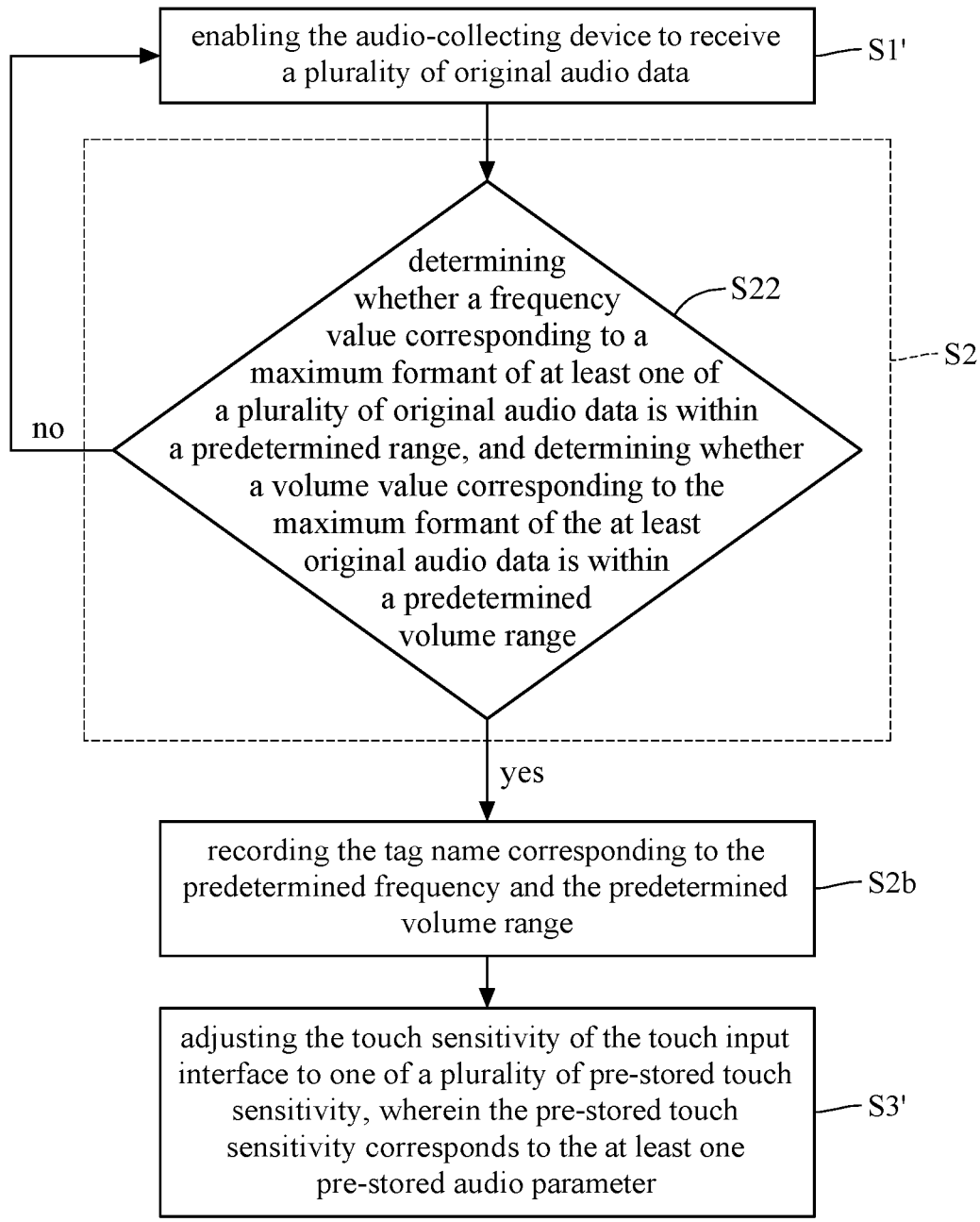
FIG. 7 is a flow chart of a method for adjusting touch sensitivity according to another embodiment of the present disclosure.

Please refer to FIG. 7, which is a flow chart of a method for adjusting touch sensitivity according to another embodiment of the present disclosure. In comparison with FIG. 3A, step S2 of FIG. 7 further includes step S22. As shown in FIG. 7, in step S22, the processor 12 determines whether a frequency value corresponding to a maximum formant of at least one of a plurality of original audio data is within a predetermined range, and determines whether a volume value corresponding to the maximum formant of the at least original audio data is within a predetermined volume range.

In step S2b, in response to the frequency value corresponding to the maximum formant of the at least original audio data being within the predetermined rang and the volume value corresponding to the maximum formant of the at least original audio data is within the predetermined volume range, the processor 12 records the tag name corresponding to the predetermined frequency and the predetermined volume range.

In a practical example, when frequency values corresponding to maximum formants of two of a plurality of input audio data are 122 Hz and 123 Hz respectively, the processor 12 determines the frequency values are within a predetermined frequency range (122 Hz-124 Hz). Further, when volume values corresponding to the maximum formants of the two input audio data are −28 dB and −29 dB respectively, the processor 12 determines the volume values are within a predetermined volume range (−28 dB-−30 dB). In this case, the processor 12 records the timestamps of two input audio data as selected timestamps, and records the tag name of "Tapping with fingertips (without gloves)" corresponding to the predetermined frequency range (122 Hz-124 Hz) and the predetermined volume range (−28 dB-−30 dB) as a selected tag name.

In brief, in the embodiment of FIG. 7, the processor 12 not only determines whether the frequency values corresponding to the maximum formants are within the predetermined frequency range, but also determines whether the volume values corresponding to the maximum formants are within the predetermined volume range. In practical, by taking the advantage of a double comparison involving the aspects of frequency and volume, the processor 12 is capable of confirming the tag name of the input audio data more accurately. In one case, there may be an overlapping part between two predetermined frequency ranges. With the benefiting due to the further comparison of volume, the accuracy in determination of the tag name could be improved.

Based on the above description, in the method for adjusting touch sensitivity and the mobile device utilizing the same disclosed in the present disclosure, the sounds of tapping against the body of the mobile device by the user can be collected for audio-data analysis, so that the mobile device is capable of recognizing whether the user is wearing gloves or not. Further, the touch sensitivity of the mobile device can be adjusted automatically by the background application program. Therefore, the touch sensitivity of the touch input interface can be adjusted to a mode required by the user. Accordingly, the conventional defects of touch sensitivity adjustment are solved. Furthermore, convenience and experience of users are improved.

What is claimed is:

1. A method for adjusting touch sensitivity, comprising:
enabling an audio-collecting device to receive one or more original audio data;
determining whether an audio parameter of at least one of the one or more original audio data matches at least one pre-stored audio parameter, wherein the audio parameter of the at least one original audio data comprises a frequency value corresponding to a maximum formant, and the at least one pre-stored audio parameter comprises a predetermined frequency range; and
adjusting a touch sensitivity of a touch input interface to one of a plurality of pre-stored touch sensitivity in response to the audio parameter of the at least one original audio data matching the at least one pre-stored audio parameter, wherein the pre-stored touch sensitivity corresponds to the at least one pre-stored audio parameter,
wherein adjusting the touch sensitivity of the touch input interface to one of the plurality of pre-stored touch sensitivity in response to the audio parameter of the at least one original audio data matching the at least one pre-stored audio parameter comprises: adjusting the touch sensitivity of the touch input interface to one of the plurality of pre-stored touch sensitivity in response to the frequency value corresponding to the maximum formant of the at least one original audio data within the predetermined frequency range.

2. The method for adjusting touch sensitivity according to claim 1, wherein the audio parameter of each of the one or more original audio data further comprises a volume value, enabling the audio-collecting device to receive the one or more original audio data comprising:
comparing the volume value of each of the one or more original audio data to a preset value for selecting the at least one original audio data from the one or more original audio data, wherein the volume value of the at least one original audio data which is selected is greater than the preset value.

3. The method for adjusting touch sensitivity according to claim 1, wherein the one or more original audio data comprises a plurality of original audio data, the method further comprises:
 recording a timestamp of each of the plurality of original audio data; and
 determining whether an interval between the timestamps of two of the plurality of original audio data is less than a predetermined value.

4. The method for adjusting touch sensitivity according to claim 1, wherein
 the method further comprises: recording a tag name corresponding to the predetermined frequency range in response to the frequency value corresponding to the maximum formant of the at least one original audio data being within the predetermined frequency range, wherein the tag name corresponds to the pre-stored touch sensitivity.

5. The method for adjusting touch sensitivity according to claim 4, wherein the touch sensitivity of the touch input interface has a plurality of modes, each of the plurality of modes corresponds to a respective one of the plurality of pre-stored touch sensitivity, the touch sensitivity of the touch input interface is in a first mode of the plurality of modes when the audio-collecting device is enabled to receive the one or more original audio data, adjusting the touch sensitivity of the touch input interface to the pre-stored touch sensitivity corresponding to the at least one pre-stored audio parameter comprises:
 determining whether the pre-stored touch sensitivity with respect to the tag name corresponds to the first mode;
 maintaining the touch sensitivity of the touch input interface in the first mode in response to the pre-stored touch sensitivity with respect to the tag name corresponding to the first mode; and
 adjusting the touch sensitivity of the touch input interface from the first mode to a second mode of the plurality of modes in response to the pre-stored touch sensitivity with respect to the tag name not corresponding to the first mode, wherein the second mode corresponds to another pre-stored touch sensitivity.

6. The method for adjusting touch sensitivity according to claim 1, wherein the audio parameter of the at least one original audio data further comprises a volume value corresponding to the maximum formant, and the at least one pre-stored audio parameter further comprises a predetermined volume range, determining whether the audio parameter of the at least one original audio data matches the at least one pre-stored audio parameter further comprises:
 determining whether the volume value corresponding to the maximum formant of the at least one original audio data is within the predetermined volume range;
 wherein the method further comprises: recording a tag name corresponding to both of the predetermined frequency range and the predetermined volume range in response to the frequency value corresponding to the maximum formant of the at least one original audio data being within the predetermined frequency range and the volume value corresponding to the maximum formant of the at least one original audio data is within the predetermined volume range.

7. The method for adjusting touch sensitivity according to claim 1, wherein before enabling the audio-collecting device to receive the one or more original audio data, the method further comprises:
 controlling the audio-collecting device to collect a plurality of test audio signals;
 analyzing each of the plurality of test audio signals for obtaining a plurality of test audio data;
 recording each of a plurality of test audio parameters corresponding to the plurality of test audio data, wherein each test audio parameter corresponds to a respective one of the plurality of test audio data; and
 tagging each of a plurality of tag names on a respective one of the plurality of test audio data; and
 storing the plurality of tag names and the plurality of test audio parameters, wherein each of the plurality of tag names corresponds to a respective one of the plurality of pre-stored touch sensitivity.

8. The method for adjusting touch sensitivity according to claim 7, wherein recording each of the plurality of test audio parameters corresponding to the plurality of test audio data comprises: recording a frequency value corresponding to a maximum formant or a volume value corresponding to a maximum formant of each of the plurality of test audio data.

9. The method for adjusting touch sensitivity according to claim 1, wherein the at least one original audio data is associated with a tap on a mobile device.

10. A mobile device, comprising:
 an audio-collecting device configured to receive one or more original audio data;
 a touch input interface, with a touch sensitivity of the touch input interface is adjustable;
 a memory having a database which is configured to store at least one pre-stored audio parameter; and
 a processor electrically connected to the audio-collecting device, the touch input interface and the memory, wherein the processor is programmed for:
 enabling the audio-collecting device to receive the one or more original audio data;
 determining whether an audio parameter of at least one of the one or more original audio data matches the at least one pre-stored audio parameter, wherein the audio parameter of the at least one original audio data comprises a frequency value corresponding to a maximum formant, the at least one pre-stored audio parameter comprises a predetermined frequency range; and
 adjusting the touch sensitivity of the touch input interface to one of a plurality of pre-stored touch sensitivity in response to the audio parameter of the at least one original audio data matching the at least one pre-stored audio parameter, wherein the pre-stored touch sensitivity corresponds to the at least one pre-stored audio parameter,
 wherein adjusting the touch sensitivity of the touch input interface to one of the plurality of pre-stored touch sensitivity in response to the audio parameter of the at least one original audio data matching the at least one pre-stored audio parameter comprises: adjusting the touch sensitivity of the touch input interface to one of the plurality of pre-stored touch sensitivity in response to the frequency value corresponding to the maximum formant of the at least one original audio data within the predetermined frequency range.

11. The mobile device according to claim 10, wherein the processor compares a volume value of each of the one or more original audio data with a preset value to select the at least one original audio data from the one or more original audio data, wherein the volume value of the at least one original audio data which is selected is greater than the preset value.

12. The mobile device according to claim 10, wherein the one or more original audio data comprises a plurality of original audio data, the processor records a timestamp of each of the plurality of original audio data and determining whether an interval between the timestamps of two of the plurality of original audio data is less than a predetermined value.

13. The mobile device according to claim 10, wherein the processor records a tag name corresponding to the predetermined frequency range in response to the frequency value corresponding to the maximum formant of the at least one original audio data being within the predetermined frequency range, the tag name corresponds to the pre-stored touch sensitivity.

14. The mobile device according to claim 13, wherein the touch sensitivity of the touch input interface has a plurality of modes, each of the plurality of modes corresponds to a respective one of the plurality of pre-stored touch sensitivity, the touch sensitivity of the touch input interface is in a first mode of the plurality of modes when the audio-collecting device is enabled to receive the one or more original audio data, the processor determines whether the pre-stored touch sensitivity with respect to the tag name corresponds to the first mode, the processor maintains the touch sensitivity of the touch input interface in the first mode in response to the pre-stored touch sensitivity with respect to the tag name corresponding to the first mode; and the processor adjusts the touch sensitivity of the touch input interface from the first mode to a second mode of the plurality of modes in response to the pre-stored touch sensitivity with respect to the tag name not corresponding to the first mode, wherein the second mode corresponds to another pre-stored touch sensitivity.

15. The mobile device according to claim 10, wherein the audio parameter of the at least one original audio data further comprises a volume value corresponding to the maximum formant and, the at least one pre-stored audio parameter further comprises a predetermined volume range, the processor determines whether the frequency value corresponding to the maximum formant of the at least one original audio data is within the predetermined frequency range, the processor determines whether the volume value corresponding to the maximum formant of the at least one original audio data is within the predetermined volume range, and the processor records a tag name corresponding to both of the predetermined frequency range and the predetermined volume range in response to the frequency value corresponding to the maximum formant of the at least one original audio data being within the predetermined frequency range and the volume value corresponding to the maximum formant of the at least one original audio data is within the predetermined volume range.

16. The mobile device according to claim 10, wherein the audio-collecting device is further configured to collect a plurality of test audio signals, the processor analyzes each of the plurality of test audio signals for obtaining a plurality of test audio data, the processor records each of a plurality of test audio parameters corresponding to the plurality of test audio data, each test audio parameter corresponds to a respective one of the plurality of test audio data, the processor tags each of a plurality of tag names on a respective one of the plurality of test audio data, and the processor stores the plurality of tag names and the plurality of test audio parameters in the memory, wherein each of the plurality of tag names corresponds to a respective one of the plurality of pre-stored touch sensitivity.

17. The mobile device according to claim 16, wherein the test audio parameter of each of the plurality of test audio data comprises a frequency value corresponding to a maximum formant or a volume value corresponding to a maximum formant of the test audio data.

18. The mobile device according to claim 10, wherein the at least one original audio data is associated with a tap on the mobile device.

* * * * *